(12) United States Patent
Chen-Kuang

(10) Patent No.: US 6,243,859 B1
(45) Date of Patent: Jun. 5, 2001

(54) METHOD OF EDIT PROGRAM CODES BY IN TIME EXTRACTING AND STORING

(76) Inventor: Hu Chen-Kuang, 4F, No. 328-3, Sec. 2, Chung Ho Rd., ChungHo City, Taipei Hsien (TW)

( * ) Notice: Subject to any disclaimer, the term of this patent is extended or adjusted under 35 U.S.C. 154(b) by 0 days.

(21) Appl. No.: 09/184,202
(22) Filed: Nov. 2, 1998
(51) Int. Cl.[7] .................................................. G06F 9/45
(52) U.S. Cl. ............................................ 717/1; 717/2
(58) Field of Search ...................... 717/1, 2, 8; 345/338, 345/336, 347, 353, 339, 342–345; 707/530, 531, 533, 1, 100, 102, 200

(56) References Cited

U.S. PATENT DOCUMENTS

| | | | |
|---|---|---|---|
| 5,798,757 | * | 8/1998 | Smith .................................... 345/338 |
| 5,802,262 | * | 9/1998 | Vanter ...................................... 714/1 |
| 6,011,551 | * | 1/2000 | Amro .................................... 345/344 |
| 6,016,467 | * | 1/2000 | Newsted et al. .......................... 704/9 |
| 6,026,233 | * | 2/2000 | Shulman et al. .......................... 717/4 |
| 6,077,311 | * | 6/2000 | Lichtenstein et al. .................... 717/4 |
| 6,134,709 | * | 10/2000 | Pratt ........................................ 717/8 |

OTHER PUBLICATIONS

Cline, "Code editors", Software Development, May 1998, pp. 55–61.*

Ward et al., "C ++ IDEs evolve", InfoWorld, Apr. 1994, pp. 70–87.*

Laitinen et al., "Evolution of the code editors", InfoWorld, Aug. 1994, pp. 62–76.*

Parker, "GUI Development tools roundup", Unix Review, Sep. 1995, pp. 65–71.*

No Aurthor, "Word processing", Windows Magazine, Nov. 1995, start p. 211.*

Kiely, "Visual InterDev 6.0——a developer's dream tool", InformationWeek, Apr. 1998, pp. 28–30.*

Barnhart, "SuperCede 2.0", Software Development, May 1998, pp. 15–20.*

Weixel, "Wordperfect 5.1 : Easier to use, feature–rich", Computerworld, Jun. 1991, pp. 54.*

* cited by examiner

*Primary Examiner*—Kakali Chaki

(57) ABSTRACT

A method of extracting and saving program codes in time while the program is being edited. The program codes are analyzed and extracted according to a set of predefined rules for the programming language. Extracted codes are further classified into different categories and stored in corresponding fields of tables of a database. Through built-in graphical user interface which consists of different forms for different purposes, programmers can reuse the stored codes by simply clicking data items or pressing buttons to select desired reusable codes and paste the codes into the file being edited in an effective and error-free way.

16 Claims, 8 Drawing Sheets

METHOD OF EDIT PROGRAM CODES BY IN TIME EXTRACTING AND STORING

FIELD OF INVENTION

This invention relates to program codes extraction. More particularly, the invention relates to a method which automatic in time analyzing and extracting reusable program codes store to a single database while the program is being edited, and by way of a graphical user-interface which users can copy and paste the stored extracted codes to the document file in focus.

BACKGROUND OF THE INVENTION

This invention, used in the environment of program editors, can in time analyze program codes and then extract reusable codes. The extracted reusable codes are classified to store in a single database. Through user-friendly graphical interfaces which facilitate the selection of data of a single field or multiple fields, the stored reusable codes are pasted into document in focus.

In a traditional program editor, it is impossible to extract frequently used program codes in time, or to paste the frequently used program codes into a program in an effective way. Comparing with the graphical window interface, this is far away from the requirement of user friendly.

It is therefore an object of the present invention to provide a method that in time extracting and saving program code, which is capable of analyzing the program codes while they are being edited, following the syntax rules of the programming language, and saving the extracted codes in time.

It is another object of the present invention to provide a method that in time extracting and saving program code. With a database which contains corresponding tables and fields, the method of the present invention stores the extracted reusable codes in the database. The stored codes are automatically classified and displayed through various forms. Thus the user can select the codes stored in fields of tables and pasted the selected data into the file in focus.

PREFERRED EMBODIMENT OF THE PRESENT INVENTION

Figure 1:
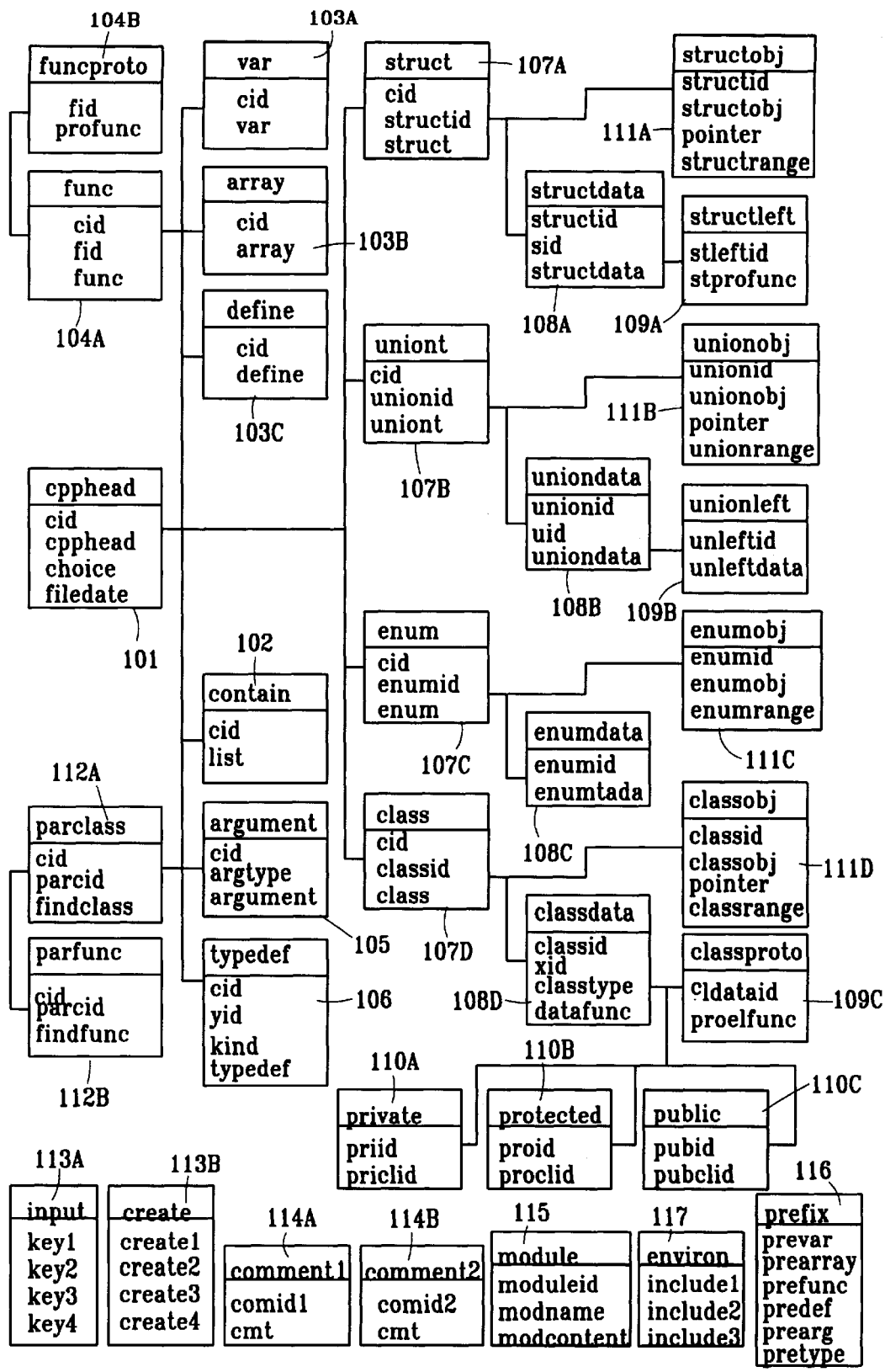
FIG. 1 is a hierarchical structure of a database according to the present invention.

Other objects and advantages of the present invention are best understood with referring to the drawings accompanied. Therefore, the detail description of the embodiment of the present invention will refer to the accompanying drawings, and use C++ object-oriented programming language as an example. For those who are skilled in the art should understand that the application of this invention is not limited to C++ programming language, but can be extended to any other programming language.

Referring to FIG. 1 where a hierarchical structure of a database according to the present invention is shown. The tables of the database and the fields consisted by the tables are shown in detail. The contents of each table and its containing fields are explained as followed:

1. cpphead table 101:

This table consists of cid field for storing native file ID's, with Counter data type; cpphead field for storing file names, with Text data type; choice field for storing file usable status, with Ture/False data type; and filedate field for storing file saving date and time, with Date/Time data type.

2. contain table 102:

This table consists of cid field for storing native file ID's, and list field for storing relative file ID's, both with Long Integer data type.

3. var table 103A, array table 103B, define table 103C:

all tables consist of cid field for storing native file ID's, with Long Integer data type; var field for storing variable names, array field for storing array names, and define field for storing defined strings, all var field, array field and define field are of Text data type.

4. func table 104A, funcproto table 104B:

Both tables consist of fid field for storing native function ID's, with Counter data type; cid field for storing native file ID's, with Long Integer data type; func field for storing function names, and profunc field for storing function prototype, both fields are of Text data type.

5. argument table 105:

This table consists of cid field for storing native file ID's, with Long Integer data type; argtype field for storing argument types, and argument field for storing argument names, both fields are of Text data type.

6. typedef table 106:

This table consists of yid field for storing native definition ID's, with Counter data type; cid field for storing native file ID's, with Long Integer data type; kind field for storing natives, and typedef field for storing type definition names, both fields are of Text data type.

7. struct table 107A, uniont table 107B, enum table 107C, and class table 107D:

all tables consist of cid field for storing native file ID's, with Long Integer data type; structid, unionid, enumid, and classid fields for storing struct, union, enum, and class native structure ID's respectively, all fields are of Counter data type; struct, union, enum, and class fields for storing struct, union, enum, and class names respectively, all fields are of Text data type.

8. structdata table 108A, uniondata table 108B, enumdata table 108C, classdata table 108D:

all tables consist of sid, uid, and xid fields for storing struct, union, and class native member ID's respectively, all fields are of Counter data type; structid, unionid, enumid, and classid fields for storing struct, union, enum, and class structure ID's respectively, all fields are of Long Integer data type; structdata, uniondata, enumdata, and datafunc fields for storing struct, union, enum, and class structure data member and member functions respectively, all fields are of Text data type; and classtype field for storing ranges of class member, with Integer data type.

9. structleft table 109A, unionleft table 109B, and classproto table 109C:

all tables consist of stleftid, unleftid, and cldataid fields for storing struct, union, and class member ID's respectively, all fields are of Long Integer data type; stprofunc, unleftdata, and proclfunc fields for storing struct, union, and class data member types and member function prototypes respectively, all fields are of Text data type.

10. private table 110A, protected table 110B, and public table 110C:

All tables consist of priid, proid, and pubid fields for storing class member ID's, all fields are of Long Integer data type; and priclid, proclid, and pubclid fields for storing class structure ID's, all fields are of Long Integer data type.

11. structobj table 111A, unionobj table 111B, enumobj table 111C, and classobj table 111D:

All tables consist of structid, unionid, enumid, and classid fields for storing struct, union, enum, and class structure ID's respectively, all fields are of Long Integer data type; structobj, unionobj, enumobj, and classobj fields for storing struct, union, enum, and class object names respectively, all fields are of Text data type; pointer field for storing object pointer status, with True/False data type; and structrange, unionrange, enumrange, and classrange fields for storing ID of file in focus, all fields are of Long Integer data type.

12. parclass table 112A, and parfunc table 112B:

Both tables consist of cid field for storing native file ID's, with Long Integer data type; parcid field for storing native class member function definition ID's, with Long data type; findclass field for storing class names of class member function definition, with Text data type; findfunc field for storing function names of class member function definitions, with Text data type.

13. input table 113A, and create table 113B:

Both tables consist of key1~key4, and create1∫create4 fields for storing a single or composite keywords, both fields are of Text data type.

14. comment1 table 114A, and comment2 table 114B:

Both tables consist of comid1, and comid2 fields for storing comment ID's, both fields are of Counter data type; cmt field for storing comment string, with Text data type.

15. module table 115:

This table consists of moduleid field for storing module ID's, with Counter data type; modname field for storing module names, with Text data type; and modcontent field for storing block character strings, with Text data type.

16. prefix table 116:

This table consists of prevar, prearray, prefunc, predef, prearg, and pretype fields for storing prefix of character string, all fields are of Text data type.

17. environ table 117:

This table consists of include1~include3 fields for storing header file names, all fields are of Text data type.

Figure 2:
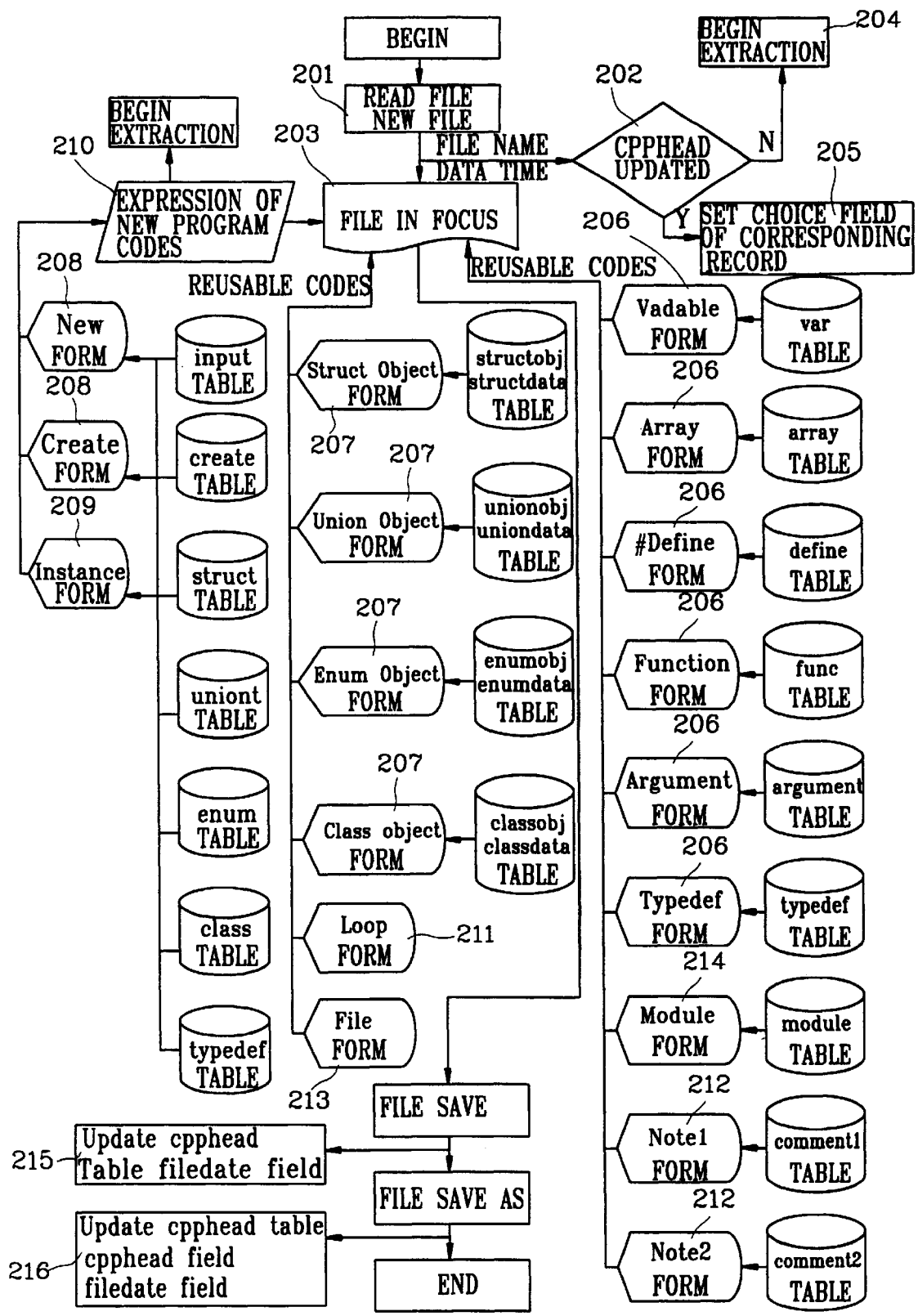
FIG. 2 is a data extraction flow diagram according to the present invention.
Figure 3:
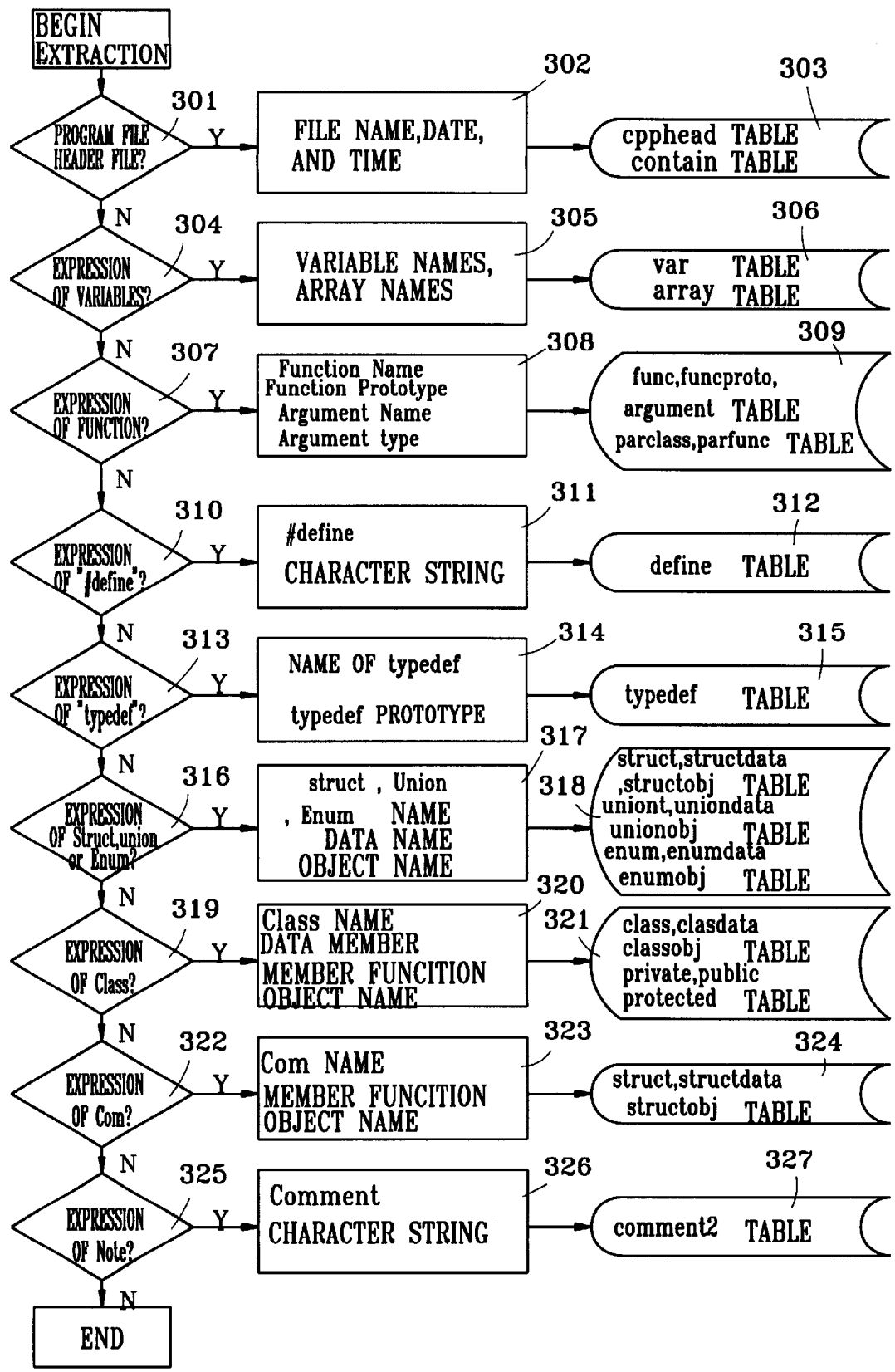
FIG. 3 is a flow diagram showing the process flow of a user interface for program editing according to the present invention.

Please now refer to FIG. 2 and FIG. 3, and the above-mentioned database structure for detail explanation of the method of this invention.

1. For opening an existing file or a new file (Step 201):

In the operation of opening an existing file, the program will read the File Name and Date Time, which will be transferred to Step 202 to verify that cpphead table contains the record relating to the opening file. According to the result of this verification:

a. If there is no record of this file stored in the database, Step 204 will be executed. Step 204 stores the file name, date and time in the cpphead field and filedate field respectively, sets choice field as "selected". and generates a unique file ID for cid field. After executing Step 204, the program codes are analyzed and extracted on a line basis, as will be described in Step 301~303 of FIG. 3.

b. If the verification step shows that the file name of this program is in the database, Step 205 will be executed to select relative fields. If the file name is in the cpphead field, yet with wrong date and time, Step 205 first deletes relative fields of data, and then analyzes and extracts the program codes on a line basis again. If the date and time are correct, or there is switching between the document form for editing the files in focus (Step 203), the program selects single-layer or multiplier-layer header file ID from cid field and list field of contain table, and sets the choice field of the file with name in cpphead field as "selected". Further on, if there is any new program code added, Step 204 analyzes and extracts the program codes on a line basis.

2. In case the header file expression consists of keyword "#include", such as:

include<windows.h> or #include "mdi.h"

a. The character string between "<" and ">", or between blank spaces, is used as header file name. The header file name is concatenated with the directory stored in the include field of environ table, and forms a complete file name with file path.

b. If the header file name is not stored in the cpphead field (Step 202), the header file name is recorded following procedure 1a. Also, native file ID is stored in cid field of contain table, and header file ID in list field. And then Step 204, 301, 302, and 303 are executed in the background for opening the header file and starting extraction. Whereas, if there is header file name in the cpphead field, the above-mentioned procedure 1b is followed to set the header file and its choice field as "selected".

3. If a variable expression consists of keyword "int" (Step 304~306), such as int variable1, variable2;

a. The character string between the keyword and ";" is used as variable names; first eliminating the blank spaces between "," or "[ ]" array symbols, and thus obtaining variable names, each separated by ",". If there is a "=", the character string to the left of "=" is used as a variable name. If there is a "*", the character string to the right of "*" is used as a variable name. The extracted variable names are stored in var field of var table, or array field of array table if with "[]" array symbols.

b. The above-mentioned procedure is following for extraction char, long, short, float, double, long double, unsigned, and const types variable names.

4. If there is any expression of function declaration (Step 307~309), such as void FunctionName(int, int);

a. First the line of code is verified to have "(" and ")", and end with ";". If verified, it is recognized as an expression of function declaration. If there is "(", yet without ")" or ending with ",", the next line of code is combined for verification again.

b. The character string between "(" and last blank space is used as a variable name. Except for expressions of class constructor, if there is no blank space in the function name, it is considered as a function call, and is not extracted. If there is "-->" or "." in a function name, the name is not extracted.

c. The function name is added "( );" to its right to for a function name for calling, and is then stored in func field of func table. Function prototype is stored in profunc field of funcproto table.

5. If there is any expression of function definition or class definition (Step 307~309), such as void FunctionName(int argument1, int argument2)
   void ClassName::NumberFunction(int argument1, int argument2)

a. First the line of code is verified to have "(" and ")", and without ";". It is considered as an expression of function definition. If the expression consists of "::", the character string to the left of ":::" and in between a blank space, is used as class name and stored in findclass field of parclass table. The character string to the right of of ":::", and to "(", is used as a member function name, and is stored in findfunc field of parfunc table.

b. The character string between "(" and ")" is further separated by "," to obtain argument types and argument names. The character string to the left of the last blank space is used as an argument type, and is stored in argtype field of argument table; the character string to the right of the last blank space is used as an argument name, and is stored in argument field.

6. If any expression of definition consists of keyword "#define" (Step 310~312), such as define radius 8 or #define maximum(x, y) (((x)> (y))?(x):y))

The character string to the right of the keyword and to a blank space is used as a definition character string, and is stored in define field of define table.

7. If any expression of type definition consists of keyword "typedef" (Step 313~315), such as typedef struct tagSTRUCTNAME STRUCTNAME;

The character string between the keyword and ";", and right to the last blank space, is used as a type definition character string, and is stored in typedef field of typedef table. The character string to the left of the last blank space, is used as a native type, and is stored in kind field.

8. If any single-line or multiple-line structured expression consists of keyword "struct" (Step 316~318), such as struct tagSTRUCT: publlic inheritedNAME
{
int data;
void structFUNCTION(int, int);
} structobject;

a. The character string between the keyword and "{" or ":" is used as a tag name. If there is any blank space in between, the character string to the right of the blank space is used as a tag name and stored in struct field of struct table. If a tag name is a null string, a randomly generated character string is used as a tag name and a uniquely generated struct native ID is stored in structid field. The character string between the keyword "public" and "{" is used as an inherited struct name. The struct table is searched through it struct field for a native structid. The data member and member types of the inherited struct name are selected according to the structid, and stored in structdata field and stprofunc field respectively.

b. The character string after "{" and with ";", but without "(", is used as a data member. The blank spaces in between the ",", or "[ ]", are firsted eliminated. If there is ":", the character string to the left of the ":" is used. The character string to the left of the last blank space is used as data member types, and to the right as data member names. Each data member name is separated by a ",".

c. The extraction method of member function and member function definition follows the above-mentioned method for member function and function definition.

d. Data members and member functions are stored in structdata field, and a data member ID for each is generated and stored in sid field. Data member types and member function prototypes are stored in stprofunc field.

e. The character string with "}" and ";" ending is identified as a struct ending expression.

1. If there is no keyword "typedef" before keyword "struct", the character string between "}" and ";" is used as object names, each separated by ",". If there is "=", the character string to the left of "=" is used as an object name. If there is "*", the character string to the right of "*" is used as an object name, and pointer field is set as TRUE. Object names are stored in structobj field, and the ID of the file in focus in structrange field.

2. If there is keyword "typedef", keywords "typedef" and "struct" and tag names are first combined. The combination result is then combined with the character string between "}" and ";", separated by ",", to form expression of type definition. The method of extraction for type definition follows the abovementioned procedure.

f. The method of extraction for union expression is similar to that for struct expression. The only difference is that tag names, data members and member types, object names, and native file ID's are stored in corresponding fields of uniont, uniondata, unionleft, and unionobj tables respectively.

g. The method of extraction for enum expression is similar to that for struct expression. The only difference is that if character strings separated by "," consist of "=", the character string to the left of "=" is used as a data member. Tag names, data members, object names, and native file ID's are stored in relative fields of enum, enumdata, and enumobj tables respectively.

h. The method of extraction for class expression is similar to that for struct expression. The only difference is (Step 319~321):

1. The tag name is stored in class field of class table, and a uniquely generated class ID stored in classid field; if the class is a privately inherited, a public, protected data member ID and member function ID are selected from public and protected tables according to inherited class ID, and stored in priid field of private table, and native classid stored in priclid field. Protected inheritance is stored in proid field, and native classid in proclid field of protected table. Public inheritance is stored in pubid field, and native classid in pubclid field of public table.

2. Data members and member functions are stored in datafunc field, and native class ID in classid field of classdata table. A uniquely generated member ID is stored in xid field, and classtype is set according to if the member is private, protected, or public. Member ID and classID are stored in priid field and priclid field of private table, or proid field and proclid field of protected table, or pubid field and pubclid field of public table.

3. Data member types and member function prototypes are stored in proclfunc field of classproto table, object names in classobj field of classobj table, ID of file in focus in classrange field.

9. If there is single-layer or multiple-layer nested structure expressions in class, struct, union, or enum expressions, the method of extraction follows the above-mentioned procedure.

a. The nested structure keyword is used as data member type, tag name as data member, and stored in corresponding fields of upper layer structure. If there is any object name at the end of the nested structure, the nested structure keyword and tag name are used as data member type, object name as data member, and stored in corresponding fields of upper layer structure.

b. If a class expression consists of enum expressions, the data members of enum expressions are stored as data members of class. If union expressions of inner nested structure expression have no tag name and object name, data members are stored in corresponding fields of upper layer structure.

10. If there is any com interface expression (Step 322~324), such as

DECLARE_INTERFACE_(com2, com1)
{
STDMETHOD(FunctionName) (void FA *Argument1) PURE;
STDMETHOD_(unsigned long, FunctionName2) (THIS) PURE;
};

a. DECLARE_INTERFACE_(com2, com1) is first considered as a function definition. The character string to the left of "(" if compared to be equal to "DECLARE_INTERFACE_", it is identified as an expression of corn interface structure. The character string is converted to "struct com2 : public com1". The method of extraction for the corn interface expression follows that for struct expressions.

b. The character string between "(" and is used as member function name. If there is ",", the character string to the right of "," is used instead. The method of extraction follows that for function expressions.

c. If expression of BEGIN_INTERFACE_PART(com, com1) consists of any class expression, "BEGIN_INTERFACE_PART(com, com1)" is converted to "struct Xcom2: public com1". The method of extraction follows that for nested structure expressions.

11. If any expression consists of keywords "struct", "union", "enum", or "class", or an object instance expression without any keyword (Step 316~321), such as

[struct|union|enum|class] tagNAME object1, *object2;
typedefNAME object3;

a. If an expression consists of keywords "struct", "union", "enum", or "class", the character string between the keyword and a blank space is used as a tag name, the character string between the blank space and ";" as object name. The tables of the database is searched through, according to type of the keywords, get tag name native ID.

b. If there is no keyword, the character string to the left of the blank space is used as tag name, to the right of the blank space as object name. The tag name field of class, struct, uniont, and enum tables are searched through in order, for a compatible tag name, and the search result is a tag name native ID.

c. The ",", or the blank spaces of "[ ]", and ";" ending symbol are first eliminated, and object names separated by "," are obtained. Object names and tag name native ID's are stored in corresponding fields of structobj, unionobj, enumobj, and classobj tables. If an object name consists of a "*" or "<", the character string to the right of "*" or "<" is used as an object name, and pointer field is set as TRUE. If the object name is stored in header file, range field is set to "0", representing a global object name; otherwise, native file ID representing local object name is stored.

d. If the character string to the left of the blank space is a type definition, converting the character string as a native type from kind field of typedef table. The method of extraction follows that for variables. If native type consists of "*", pointer field of object names are set to TRUE.

12. If there is expression (Step 316~321), such as tagCLASS *object=new tagCLASS(...);
object=new tagCLASS(...);
tagNAME *object=function(...);
tagCLASS object(...);

a. The expression is first considered as a function definition expression, and the character string to the left of "(" is extracted.

b. If it is verified there is "=" and keyword "new", the character string to the left of "=" is tested to have any blank space. If there is no blank space, the character string to the right of "new" is used as a tag name, and to the left of "=" as an object name. The method of extraction follows that for object instance, and pointer field of the object name is set to TRUE.

c. If the character string consists of "=", but without keyword "new", the character string to the left of "=" is tested to have any blank space. If there is no blank space, no extraction is required; otherwise, the method of extraction follows that for variable and that for object instance.

d. If the character string contain no "=", and keyword "new", but with blank space, the method of extraction follows that for object instance.

e. The method of extraction for expression of object instance without function format follows the above-mentioned procedure.

13. If there is expression such as

CATCH(exceptionCLASS, object)
AND_ CATCH(exceptionCLASS, object)

First the expressions are identified as function definition. The character string to the left of "(", if compared to be equal to "CATCH" or "AND_ CATCH", is considered as expression of exception handling. The character string between "(" and ")" are further divided according to ",". The character string to the left of "," is used as class tag name, and to the right as object name. The method of extraction follows that for object instance, and pointer field of the object name is set to TRUE.

14. If there is any expression consists of keyword "extern", such as extern int variableNAME;

The method of extraction follows that for identifying variables, function and object instance, for character string between the keyword and ";".

15. If there is any single-line or multiple-line comments (Step 325), such as

/* comment string */ or //comment string

The character string between "/*" and "*/", or to the left of "//" is used as comments, and stroed in cmt field of comment2 table. If character string comment is combined with program codes, extraction of comment is performed first.

16. No extraction is performed for expressions with keywords "do", "while ( )", "if ( )", "for ( )", "else", "#ifdef", "#else", "#endif", "#pragma", "switch ( )", "case", "break" "default", "delete", or "return".

17. Single-line program code ending with "\" is concatenated with the program code of next line for extraction. "Tab" in the program code is replaced with a blank space during extraction.

18. After file saving is executed, filedate field of cpphead table is updated with the date and time when the file is saved (Step 215). After save as is executed, cpphead field and filedate field of cpphead table are updated with new file name and file saving date and time (Step 216).

Above description shows that present invention discloses a method of extracting, in a very effective way, the keywords and program codes of a programming language, based on predefined identifying rules. The extraction is performed in a time.

Present invention also provides a user-friendly program editing interface, such that users can edit programs effectively. To avoid over extending the length of this specification, only part of the forms of the interface will be explained in detail.

Figure 4:
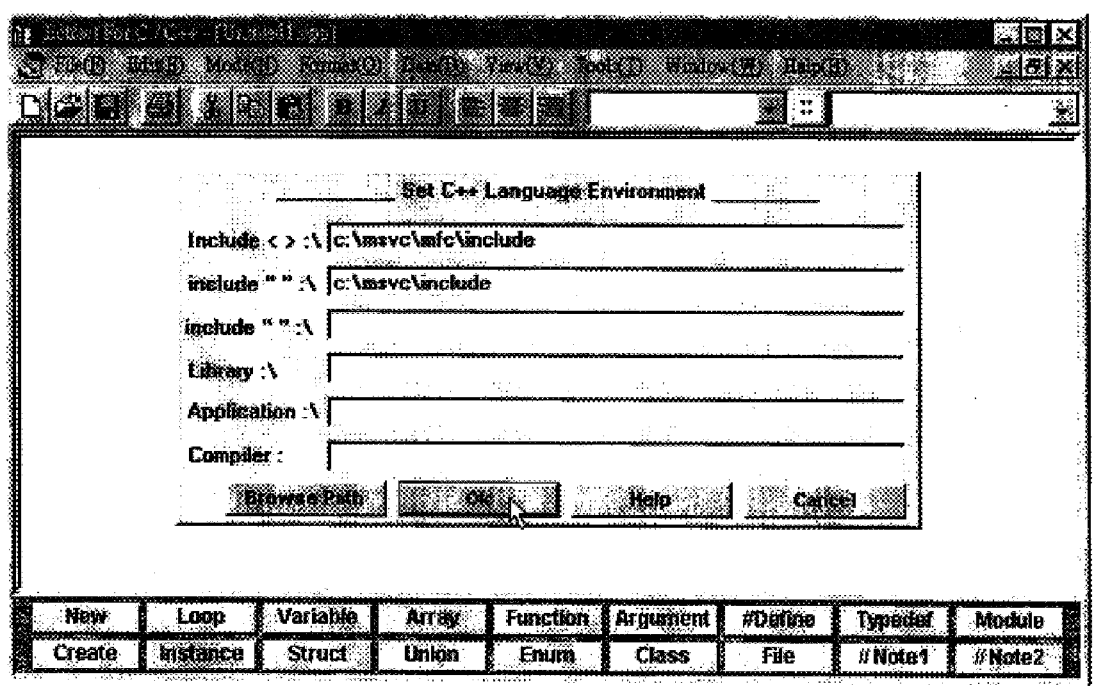
FIGS. 4A–E show examples of user interface for program editing according to the present invention.
Figure 4:
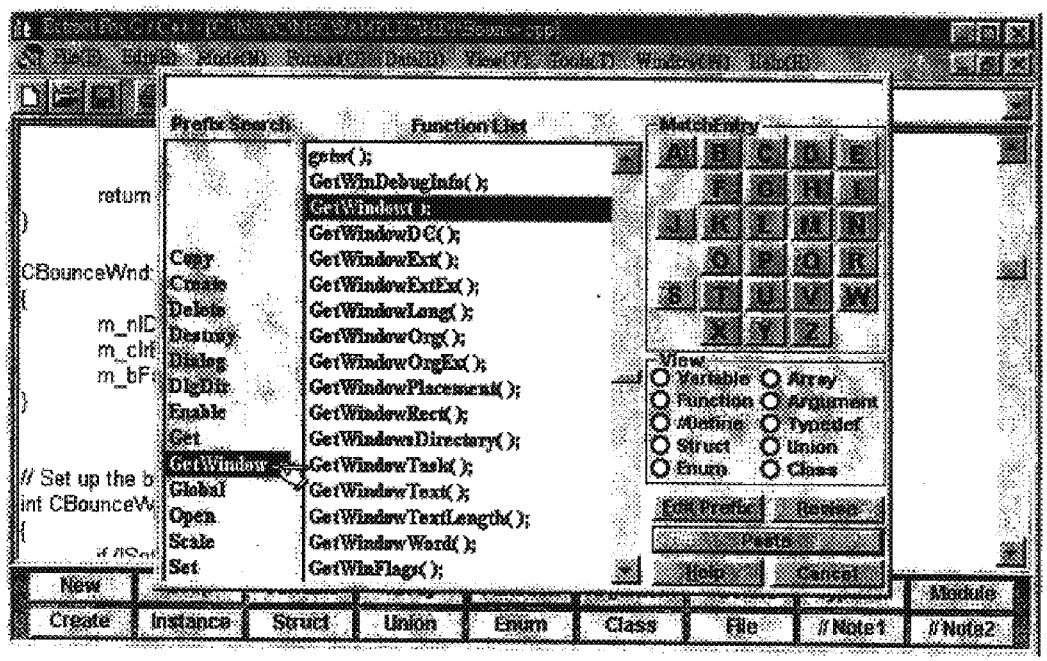
Figure 4:
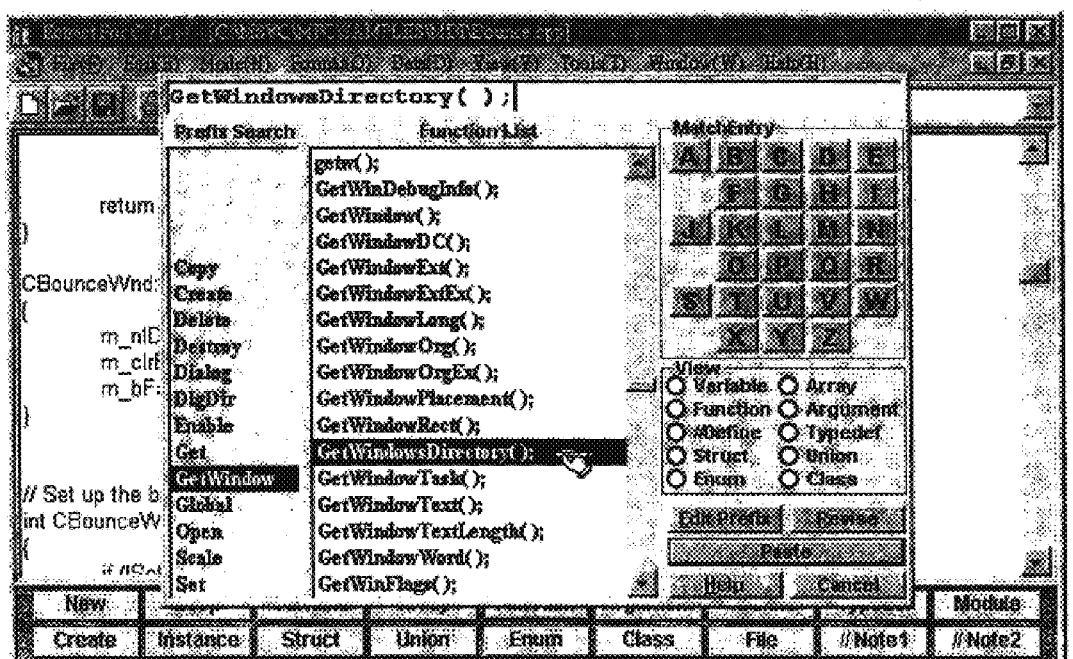
Figure 4:
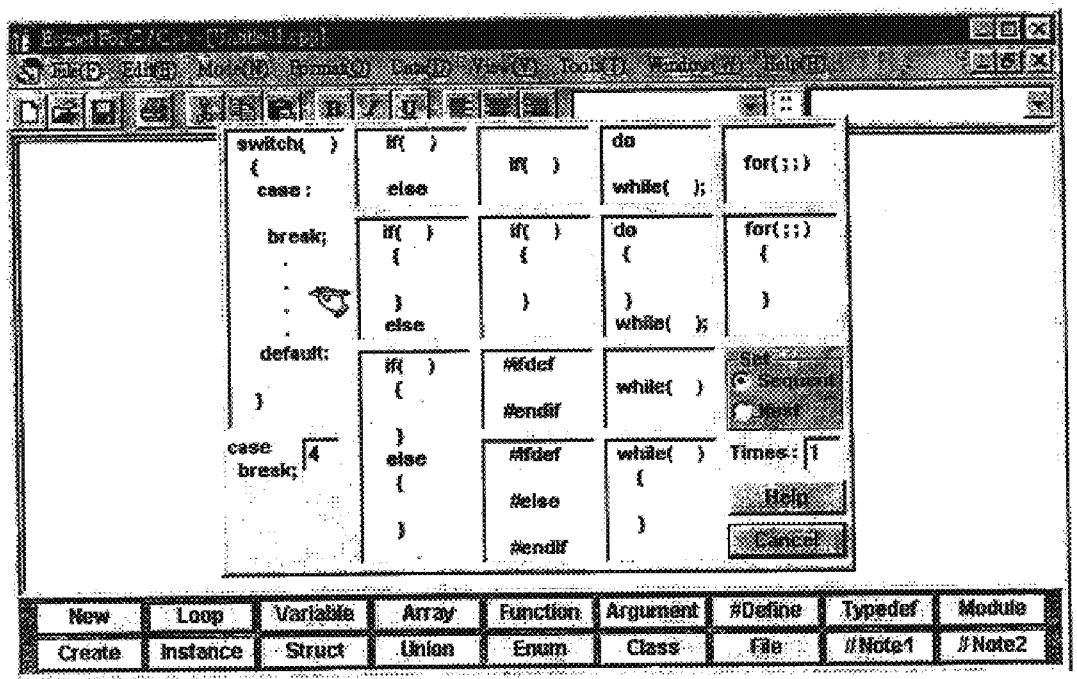
Figure 4:
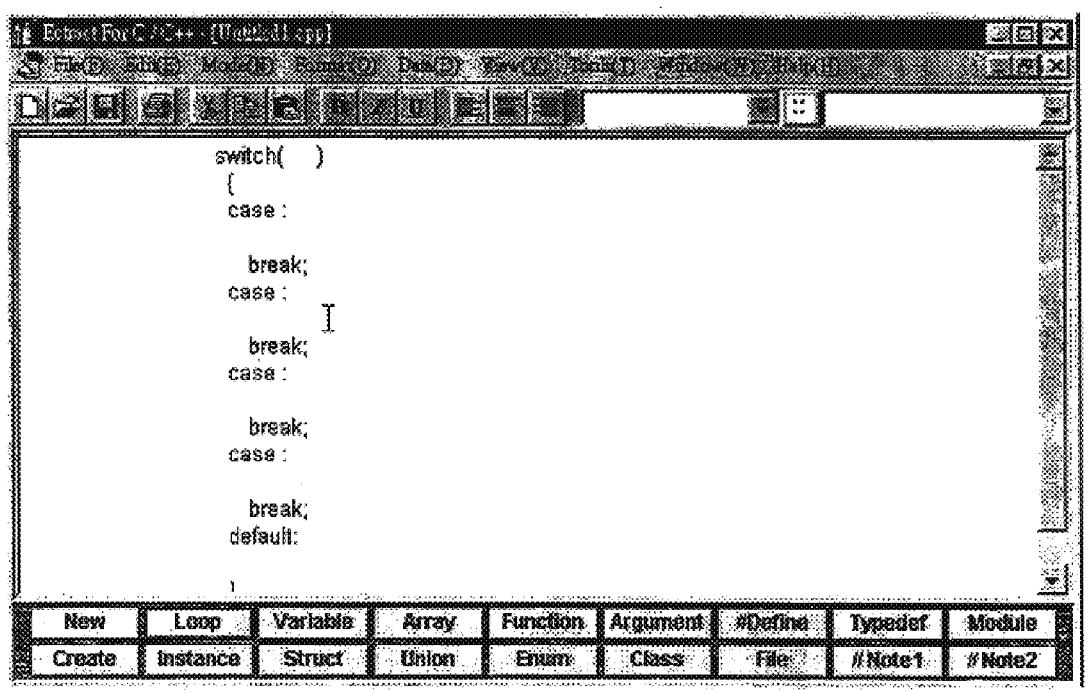

FIG. 4 shows a form for the users to set the working environments of the program before the program editing is actually started. Using C++ programming language as an example, the user can first set the path of header files which consist of keyword "#include", path of the complier of the programming language, and so on. After setting the working environment, the user can go into forms of user interface of next level by clicking buttons. The forms of user interface include New, Loop, Variable, Array, Function, Argument, #Define, Typedef, Module, Create, Instance, Struct, Union, Enum, Class, File, Note1, and Note2, each can be opened by clicking a button representing the form. Most of the forms have Data Bound List Control showing the data of corresponding database fields. The data showing in the Cata Bound List Control can be selected by clicking it, and pasted into the form with the file in focus.

1. Forms of Variable, Array, Function, Argument, #Define, Typedef (Step 206):
    a. All the forms have "Prefix Search" and "List" Data Bound List Control, Edit Control, Letter Buttons, Data Switching Option Buttons. Please refer to FIGS. 4B–4C, Function form will be used as an example for explaining the operation of an user interface.
    b. When the separate form is displayed, according to the true value of choice field in cpphead table "List" Data Bound List Control shows the selected values representing variables, arrays, functions, argument names, defined strings, and type definition character strings. The values are stored in the field of var, array, func, argument, define, and typedef tables. "Prefix Search" Data Bound List Control shows the values of the fields of prefix table. To fast search the data in "List" Data Bound List Control, the user can click the prefix displayed in the "Prefix Search" Data Bound List Control, or click Letter Button, or press the letter key on the keyboard. The field value of Prefix form can be edited to meet user's requirements. FIG. 4B shows that after "GetWindow" of "Prefix Search" Data Bound List Control is clicked, "Function List" Data Bound List Control displays the fast search results of "GetWindow" prefix.
    c. The user can double click the data in the "List" Data Bound List Control to paste the data into the Edit Control. To paste the data into the file in focus, the user can click the "Paste" button. Or the user can click the Data Switching Option Button to display the extraction results of different forms. Right clicking type definition character string or function name will display "Prototype" form, and list native type or function prototypes. The arguments of function prototypes can be edited to become expression of function definition, and then extracted and pasted into the file in focus. FIG. 4C shows that after "GetWindowDirectory( )" of "Function List" Data Bound List Control is clicked, data is pasted into Edit Control.
    d. Double click an argument name will test the argument type, based on the value of argtype field of argument table.
        (1) If the value consists of keywords "struct", "union", "enum", or "class", the character string to the right of the keyword is a tag name. The corresponding fields of the tables of the database will be searched, based on the keyword type, and the search result is a tag name native ID. If there is no keyword, first considering the argument type as a tag name, and searching through the tag name field of class, struct, uniont, and enum tables for a matching tag name native ID. If the tag name has a "*", the character string to the left of "*" is used as a tag name. "-->" will be added in the Edit Control; otherwise, "." is added. If there is a blank space in the character string, the character string to the left of the blank space is used a tag name.
        (2) If the argument type is tested to be of type definition, it is converted to be native type from the kind field of typedef table. And the extraction follows the above-mentioned procedure.
        (3) If the argument type match the test, the form is closed and invoke Object form. According to the tag name native ID, the data selected from database, is listed in the "Data" Data Bound List Control.

2. Forms of Struct, Union, Enum, and Class object (Step 207):
    a. All the forms have "Object" and "Data" Data Bound List Controls, Edit Control, "Class Object", "Class Name", "Private", "Protected", and "Public" Option Buttons, and "AllData" Check Box.
    b. When the separate object form is displayed, the local and global object names stored in the fields of structobj, unionobj, enumobj, and classobj tables, are listed in "Object" Data Bound List Control. If "ClassNmae" Option Button is clicked, the class names in the class field are listed in "Object" Data Bound List Control.
    c. If an object name in the "Object" Data Bound List Control is double clicked, and if the pointer field of the clicked name is set to TRUE, the name is pasted into the Edit Control, and an "-->" is added to the object name, otherwise "." is added. If the object name is an enum object name, an "=" is added; otherwise, if a class tag name, an "::" is added. The relating data of the object is selected from database, according to its native ID, and displayed in "Data" Data Bound List Control. If the native ID is a class native ID, clicking "Public" Option Button will display public data members and member functions of classdata and public table, in "Data" Data Bound List Control. Otherwise, clicking "Private" or "Protected" Option Button will display private or protected data members and member functions from classdata, private and protected table, in "Data" Data Bound List Control.
    d. Double clicked a data member or a member function in the "Data" Data Bound List Control, it is pasted into the Edit Control. Use the same method above-mentioned d (1). If the data member native type match the test, according to its tag name native ID, data of the object is selected from database and displayed in "Data" Data Bound List Control. After the member function is copied into the Edit Control, it is checked to verify having "::" ending, extracting argument name of function prototype and inserting it in between "(" and ")"; if data member has "::" at the end of the character string when copying into the Edit Control, and data member type is class, struct, union, or enum, data member being a tag name of a nested structure; according to tag name native ID displaying data of corresponding fields in "Data" Data Bound List Control, and adding "::" in the Edit Control;

e. (1) Clicking control key and then selecting a class object or a tag name will display all the data members or member functions of the name in the "Data" Data Bound List Control.

(2) Checking "AliData" Check Box will display all the data members of the type of form, in the "Data" Data Bound List Control.

(3) Right clicking one of the value in the "Data" Data Bound List Control will display "Prototype" form, with data members or member functions prototype listed. While being displayed, the member functions prototype are combined with the character string with "::" ending in the Edit Control become a class member function definition expression, and can be extracted and pasted into the file in focus.

f. Clicking "Paste" button will paste the program codes in the Edit Control into the file in focus; otherwise, clicking Data Switching Option Button displays extracted data of different forms.

3. Forms of New and Create (Step 208 and 210 of FIG. 2):

a. All the forms have "struct", "union", "enum, "typedef", and "class" Option Buttons, multiple Data Bound List Controls, and an Edit Control. New form is used for editing variables, functions, definition character strings, and type definition character strings; Create form is used for editing structured codes.

b. Both forms display single-word and composite keywords selected from key field of input table or from create field of create table, in the Data Bound List Controls. Clicking the displayed keyword to copy it into the Edit Control. Data in the key field and create field can be edited to fit user's requirements.

c. Clicking respective Option Button will display tag names from struct, uniont, enum, or class field, or type definition character strings from typedef field, in the Data Bound List Control for being clicked and pasted into Edit Control.

d. After the character strings in the Edit Control is copied into the file in focus, variables, functions, definition character strings, type definition character strings, and structured expressions can be extracted following the above-mentioned procedures.

4. Instance form (Step 209~210):

a. Instance form has "struct", "union", "enum", "typedef", and "class" Option Buttons, pull-down Data Bound List Controls, and an Edit Control. Clicking Option Button will display tag names or type definition character strings of typedef field, in the pull-down Data Bound List Controls. Inputting an object name into the Edit Control completes the expression of instantiation of an object.

b. After the object instantiation is pasted into the file in focus, the extraction follows the above-mentioned procedures.

5. Loop form (Step 211):

a. Loop form mainly consists of the Condition Option Label Control of "do while ( );", "do { } while ( );", "while ( )", "if ( )", "for (;;)", "for (;;) { }", if ( ) else", "if ( ) { } else", "if ( ) { } else { }", "#ifdef #endif", "#ifdef #else #endif", and "switch ( ) { case:break;default: }", "Sequent" and "Nest" Option Buttons, and "Times: " Edit Control, as FIG. 4D shows.

b. Selecting "Sequent" or "Nest" Option Button, and setting number of "Times: ", and clicking Condition Option Label Control, will have expressions of single-layer or multi-layer of sequented and nested condition loops automatically written into the file in focus. Setting the number of "case:break" can have the label automatically number of times into the file in focus. Please refer to FIGS. 4D and 4E. First in FIG. 4D, the "switch ( ) {case:break;default:}" label is selected, and click "Sequent" Option Button and set the number of "case:break" as 4. In the file in focus, the "case:break" is repeated 4 times, as FIG. 4E shows.

6. Forms of Note1 and Note2 (Step 212 of FIG. 2):

Basically the two forms are the same, each has Data Bound List Control, Letter Buttons. When Note1 is displayed, frequently used commets in the cmt field of comment1 table is listed in Data Bound List Control. When Note2 is displayed, commets which has been identified and extracted and stored in the cmt field of comment2 table is listed in Data Bound List Control. Double clicked comments can be pasted into the file in focus with "/* */" or "//" added automatically.

7. File form (Step 213):

File form is a File Dialog Control, which provides file name and path. The file name and path will be first converted to the format of the programming language, such as "c:\\graphics\\picture.bmp", and then be pasted into the file in focus.

8. Module form (Step 214):

a. Module form consists of Data Bound List Control which displays the module names in the modname field of module table, and an Edit Control which displays the contents of modules. The modules can be pasted into the file in focus.

b. When there is any reversed block in the file in focus, clicking Module Button will display input dialog for a module name. The inputted module name is stored in modname file of module table, and the reversed block in modcontent field.

9. Clicking pull-down class and function Data Bound List Control will display the data of findclass field of parclass table, and data of findfunc field of partfunc table respectively, which facilitates the fast search of the expression of class member function definition presented in the file in focus.

10. DeleteFile form consists of a Data Bound List Control displaying the file names in the cpphead field of cpphead table. Clicking one of the file name, and pressing DeleteFile Button will delete all the extraction of the file stored in the database.

It should be understood that the preceding description sets out the preferred embodiment of the present invention according to the mandates of the patent statutes. However, many modifications of the unique concepts disclosed herein should become apparent to one skilled in the art after reading the preceding description. Therefore, while this invention has been described in connection with particular examples thereof, no limitation is intended thereby except as defined by the appended claims.

What is claimed:

1. A method for extracting and storing program codes in time, the method automatically classifies program codes and stores in database fields, and allows the stored program codes to be pasted into a program in focus through user interfaces, the method includes:

building a database with tables which consist of fields according to the rules of syntax of the program codes;

in time extracting program codes according to an identifying procedure while the program is being edited;

classifying the extracted program codes and then storing in the fields of the database; and displaying single or multiple fields for being selected to be pasted into another program in focus.

2. A method according to claim 1, wherein the database tables include cpphead table, contain table, var table, array table, define table, func table, funcproto table, argument table, typedef table, struct table, uniont table, enum table, class table, structdata table, uniondata table, enumdata table, classdata table, structleft table, unionleft table, classproto table, private table, protected table, public table, structobj table, unionobj table, enumobj table, classobj table, parclass table, parfunc table, input table, create table, comment1 table, comment2 table, module table, prefix table, and environ table.

3. A method according to claim 2, wherein the header of the database includes cpphead table, which includes cid field, with Counter data type, for storing native file IDs; cpphead field, with Text data type, for storing file names; choice field, with True/False data type, for storing file open status; filedate field, with Date/Time data type, for storing file storing date and time; contain table which includes cid field for storing native file ID; list field for storing relative file IDs, both cid field and list field having Long Integer data type; var table, array table, define table, which include cid field, with Long Integer data type; var field for storing variable names; array field for storing array names; define field for storing defined strings, var, array, and define fields all having Text data type; func table, funcproto table, which include fid field, with Counter data type, for storing native function IDs; cid field, with Long Integer data type, for storing native file IDs; func field for stroing function names; profunc field for storing native function prototypes; both func and profunc fields having Text data type; argument table, which includes cid field, with Long Integer data type, for storing native file IDs; argtype field for storing argument data types, argument field for storing argument names, both argtype and argument fields having Text data type; typedef table, which includes yid field, with Counter data type, for storing native type definition IDs; cid field, with Long Integer data type, for storing native file IDs; kind field for storing native type, typedef field for storing type definition names, both kind and typedef fields having Text data type; struct table, uniont table, enum table, and class table, which include cid field, with Long Integer data type, for storing native file IDs; structid, unionid, enumid, and classid fields, with Counter data type, for storing struct, union, enum, and class native structure IDs respectively; struct, uniont, enum, class fields, with Text data type, for storing stuct, union, enum, and class names respectively; sid, uid, xid fields, with Counter data type, for storing stuct, union, and class native member IDs; structid, unionid, enumid, and classid fields, with Long Integer data type, for storing struct, union, enum, and class structure IDs respectively; structdata, uniondata, enumdata, and datafunc fields, with Text data type, for storing stuct, union, enum, and class data members and member functions; classtype field, with Integer data type, for storing ranges of class members; structleft, unionleft, and classproto tables, which include stleftif, unleftid, and cldataid fields, with Long Integer data type, for storing struct, union, and class member IDs respectively; stprofunc, unleftdata, and proclfunc fields, with Text data type, for storing struct, union, and class data member types and native member functions respectively; private, protected, and public tables, which include prrid, priod, and pubid fields, with Long Integer data type, for storing class member IDs; priclid, proclid, and pubclid fields, with Long Integer data type, for storing structure IDs of class; structobj, unionobj, enumobj, and classobj tables, which include, structid, unionid, enumid, and classid fields, with Long Integer data type, for storing structure IDs of struct, union, enum, and class; structobj, unionobj, enumobj, and classobj fields, with Text data type, for storing struct, union, and class object names; pointer field, with True/False data type, for storing object pointer status; structrange, unionrange, enumrange, and classrange fields, with Long Integer data type, for storing ID or file in focus; parclass, and parfunc tables, which include cid field, with Long Integer data type, for storing native file IDs; parcid field, with Long data type, for storing IDs of native class member function definition; findclass field, with Text data type, for storing class names of class member function definition; findfunc field, with Text data type, for storing function names of class member function definition; input table, and create table, which includekey1~key4 fields and create1~create4 fields, with Text data type, for storing single or composite key words; comment1 and comment2 tables, which include comid1 and comid2 fields, with Counter data type, for storing comment ID; cmt field, with Text data type, for storing comment characters; module table which includes moduleid field, with Counter data type, for storing module IDs; modname field, with Text data type, for storing module names; modcontent field, with Text data type, for storing block characters; prefix table, which includes prevar, prearray, prefunc, predef, prearg, and pretype fields, with Text data type, for storing prefix character of strings; environ table, which includes include1~include3 fields, with Text data type, for storing directory names of header files.

4. A method according to claim 1, wherein the program codes include program file, header file, variable names, array names, function names, names of function arguments, defined strings, type definition strings, struct tags, union tags, enum tags, class tags, com tags, object names, data members, member functions, and comment strings.

5. A method according to claim 1, wherein the identifying procedure includes:

1) after opening an existing file or a new file:
   a) if the program file name is not stored in the database, storing the program file name, date and time in the cpphead and filedate fields of the cpphead table of the database respectively, setting the choice field as selected, generating a unique file ID in the cid field, and then extracting the program codes line by line; and
   b) if the program file name is stored in the cpphead field with different date and time, deleting relative fields and then extracting the program codes again; if with same date and time, or switching focus among files being edited, obtaining single-layer or multiple-layer header file ID from the cid and list fields of the contain table, setting choice field as selected, and then if any new code is added, extracting the program codes line by line;

2) if any expression includes "#include" keyword in header file, such as
   #include<windows.h> or #include "mdi.h"
   a) using character string between "<" and ">", or between the double quotations, as a header file name, and storing the header file name in the include field of environ table of the database, combining with the directory of the file to form a complete path of the file name;
b) if a header file name is not stored in the cpphead field, storing a header file name following the procedure of 1a); storing the native ID in the cid field, the header ID in the list field of the contain table; and then opening the header file for extracting and storing in background processing; if there is header file name in the cpphead field, following the procedure of 1b) and setting the choice field as selected;
3) if any expression including int keyword in variable expressions, such as
int variable1, variable2;
   a) using character string between the keyword and ";" as a variable name, eliminating blanks between "," or array symbol "[]", for variable names; if having "=" sign, using character string at the left of the "=" sign as a variable name; if having "*" pointer sign; using character string at the right of the "*" sign as a variable name; storing the variable name in the var field of the var table of the database; if the variable name being an array name, storing the variable in the array field of array table; and
   b) following the procedure of a), extracting char, long, short, float, double, long, double, unsigned, and const variable names;
4) if having any expression of function declaration, such as
void FunctionName(int, int);
   a) if checking and finding "(" and ")" symbols appear in the expression and ";" at the end of the expression, it is certain that the expression is a function declaration; otherwise, if only "(" in the expression, without ")" or ";", checking the expression in combination with next line program code;
   b) using the character string to the left of "(" and to the right of the last blank space, as a function name; unless in a class constructor, if there is no blank space in a function name, or there is "-->" or "." in a function name, the function name is considered a function being called, and no extraction is required; and
   c) adding "( );" to the right of the function name, and making the function name which is stored in the func field of func table a function name to be called, whereas function prototype is stored in the profunc field of funcproto table;
5) if having any expression of function definition, or class member definition, such as
void FunctionName(int argument1, int argument2)
void ClassName::NumberFunction(int argument1, int argument2)
   a) if checking and finding "(" and ")" symbols appear in the expression, and without ";", it is certain that the expression is a function definition; if "::" appears in the expressing, using the character string to the left of "::" and to the right of a blank space as a class name, and storing the class name in the findclass field of parclass table; and using the character string to the right of "::" and to the left of "(" as a member function name, and storing the member function name in the findfunc field of parfunc table;
   b) using the character string between "(" and ")" as argument types and argument names, each argument separated by a ","; using the character string to the left of a blank space as argument type stored in the argtype field of argument table, and the character string to right of the blank space as argument name stored in the argument field;
6) if having any expression with keyword #define, such as
   #define radius 8 or #define maximum(x, y) (((x)>(y)) ?(x):y)) using the character string to the right of keyword #define and to the left of a blank space as a definition character string and storing the string in the define field of define table;
7) if having any expression with keyword typedef for type definition, such as
typedef struct tagSTRUCTNAME STRUCTNAME;
   using the character string to the left of ";" and to the right of the last blank space as a type definition name, and storing the name in the typedef field of typedef table, and the character string to the left of the blank space as a native type stored in the kind field;
8) if having any expression with keyword struct for type definition in a single line or multiple lines, such as
struct tabSTRUCT : public inheritedNAME
{
int data;
void structFunction(int, int);
} structobject;
   a) using the character string between keyword struct and "{", or ": ", as a tag name; if there is any blank space, using the character string to the right of the blank space as a tag name, and storing the tag name in the struct field of struct table; if the tag name is a null string, set a random character string as the tag name, and generate a unique native struct ID in the structid field; using the character string between the keyword public and "{" as an inherited struct name, searching through the struct field of struct table for a native structid; selecting data members and member type for the inherited struct name, storing in the structdata and stprofunc fields;
   b) using the character strings after "{", and having ";", and without "(" as data members; first eliminating the blank spaces between "," or between array symbol "[ ]"; if there is ":", the character string to the left of the ":" is used; the character string to the left of the last blank space is used as data member types, and to the right as data member names; each data member name separated by a ",";
   c) following above-mentioned procedure for extracting the expressions of member function and member function definition;
   d) storing the data members and member functions in structdata field, and generating data member IDs in sid field; storing data member types and member functions prototype in the stprofunc field;
   e) verifying a ";" appearing to the right of "}" for the end of a struct ending expression;
      A) if there is no keyword typedef before keyword struct, using the character between "}" and ";" as object names, each object name separated by a ","; if there is "=", using the character string to the left of "=" as an object name; if there is "*" pointer, using the character string to the right of "*" as an object name, and setting the pointer field as true; storing the object name in structobj field and ID of the file in focus in structrange field;
      B) if there is keyword typedef, combing typedef, keyword struct and tag name, and then combing the character string between "}" and ";", and separated by ",", as a type definition expression, which should be extracted and stored following abovementioned procedure;

f) the only difference between extracting union expression and struct expression is storing tag name, data member, member type, object name, and native file ID in corresponding fields of uniont, uniondata, unionleft, and unionobj tables separately;

g) the only difference between extracting enum expression and struct expression is that if the data members separated by "," have "=", the character string to the left of "=" is used as data member; and tag name, data member, object name, and native file ID are stored in corresponding fields of enum, enumdata, and enumobj tables separately;

h) the only difference between extracting class expression and struct expression is A) storing tag name in the class field of class table, and generating an unique classID in classid field; if it is a private inheritance, selecting public and protected data member ID and member function ID from public and protected tables according to inhered class ID, and storing the ID's in priid field of private table, and native classid in priclid field; if it is a protected inheritance, storing in proid field of protected table, and native classid in proclid field; if it is a public inheritance, stroing in pubid field of public table, and native classid in pubclid field;

B) storing data member and member function in datafunc field of classdata table, native class ID in classid field, and generating a unique member ID in xid field, setting classtype according to whether it is private, protected, or public; storing member ID and classID in priid and priclid fields of private table, or in proid and proclid fields of protected table, or in pubid and pubclid fields of public table;

C) storing data member type and member function prototype in proclfunc field of classproto table, storing object name in classobj field of classobj table, ID of file in focus in classrange field;

9) if any class, struct, union, or enum expression consists of a single or nested structure expression, following above-mentioned procedure for extraction;

a) using nested structure keyword as data member type, tag name as data member, and storing in corresponding field of upper layer structure; if there is any object name at the end of a nested structure, using nested structure keyword and tag name as data member type, object name as data member, and storing in corresponding field of upper layer structure;

b) if any class expression consists of enum expression, using data member in the enum expression as the data member of the class expression and storing the member; if a union expression in a nested structure expression has no tag name or object name, storing its data member in corresponding field of upper layer structure;

10) if there is any com interface expression, such as
DECLARE_INTERFACE_(com2, com1)
{
STDMETHOD(FunctionName1) (void Far *Argument) PURE;
STDMETHOD_(unsigned long, FunctionName2) (THIS) PURE;
};

a) considering DECLARE_INTERFACE_(com2, com1) as function definition, DECLARE_INTERFACE_ string representing a corn interface structure expression; converting the string to "struct com2 : public com1" expression, and following the above-mentioned procedure for extraction;

b) for extracting member function, using the character string between "(" and ")" as member function name; if there is ",", using the character string to the right of "," as member function name, and following the above-mentioned function expression extraction procedure for extraction;

c) if any class expression consists of BEGIN_INTERFACE_PART(com, com1) expression, converting the string to struct Xcom2 : public com1 expression, and following the above-mentioned nested structure extraction procedure for extraction;

11) if any struct, union, enum, or class object, or any non-keyword object consists of any expression, such as [struct|union|enum|class] tagNAME object1, *object2; typedefNAME object3;

a) if there is keyword struct, union, enum, or class in an expression, using the character string between the keyword and a blank space as a tag name, the character string between the blank space and ";" as an object name; searching through the tag name field of the corresponding tables of the database, according to the classification of the tag name, get a tag name native ID;

b) if there is no keyword, using the character string to the left of a blank space as a tag name, the character string to the right of a blank space as an object name; searching through the tag name field of the class, struct, uniont, and enum tables of the database, for a tag name native ID;

c) eliminating "," of an object name, or blank spaces in a "[ ]" array symbol, and ";", and obtaining object names separated by ","; storing object names, tag name native ID in the corresponding fields of structobj, unionobj, enumobj, or classobj tables; if there is a "*" or "<" in an object name, using the character string to the right of "*" and "<" as an object name, and setting pointer field as True; if the object name is in a header file, setting range field as zero, representing global object name; otherwise storing native file ID representing local object name;

d) if the character string to the left of a blank space is a type definition character string, converting the character string as a native type from kind field of typedef table; if native type has a "*", setting pointer field of object name as True;

12) if there is any of the following expressions:
tagCLASS *object=new tagCLASS(...);
object=new tagCLASS(...);
tagNAME *object=function(...);
tagCLASS *object(...);

a) considering the expression as a function definition expression and extracting the character string to the left of "(";

b) checking if the character string contains "=" and keyword "new"; extracting the character string to the left of "=", and checking for any blank space; following the procedure of 11) for extraction; if there is no blank space, using the character string to the right of keyword "new" as a tag name, the character string to the left of "=" as an object name; following the procedure of 11) for extraction, and setting pointer field of the object name as True;

c) if the character string contains "=" but without keyword "new", checking to see if the character string to the left of "=" having any blank space; if there is any blank space, following the procedure of 11) for extraction; otherwise, no extraction is required;

d) if the character string contains no "=" and keyword "new", but with blank space, following the procedure of 11) for extraction;

e) for object calling expression which has no function format, following the procedure of 11) for extraction; otherwise, no extraction is required;

13) if there is any of the following expressions:
CATCH(exceptionCLASS, object)
AND_ CATCH(exceptionCLASS, object)
first considering the expression as a function definition expression; if the character string to the left of "(" equals to CATCH or AND_ CATCH character string, the expression is recognized as an exception handling expression; using the character string between "(" and ")", the character string to the left of "," as a class tag name, to the right as an object name; following the procedure of 11) for extraction, and setting pointer field of the object name as True;

14) if an expression containing keyword "extern", such as extern int variableNAME;
using the character string between the keyword and ";", following the procedure of extraction for variable, function and 11) for extraction;

15) if there is a single line or multiple line comments, such as
/*comment string*/ or //comment string
using the character string between "/* and "*/, or to the right of "/" as commet string, and storing the comment string in cmt field of coment2 table; if comment string and program code concatenate, extracting comment string first;

16) if there is any keyword of do, while ( ), if ( ), for ( ), else, #ifdef, #else, #endif, #pragma, switch( ), case, break, default, delete, or return in an expression, no extraction is required;

17) if the last character to the far right of a single line code is "\", concatenating this line with next line for extraction; if any Tab is contained in a program code, converting the Tab into a blank space; and 18) after file saving is executed, updating filedate file of cpphead table as the new saving date and time; after executing save as, updating cpphead and filedate file of cpphead table as the new file name and saving date and time.

6. A method according to claim 1, wherein the user interfaces include New, Loop, Variable, Array, Function, Argument, #define, Typedef, Module, Create, Instance, Struct, Union, Enum, Class, File, Note1, and Note2 forms, displayed by clicking the buttons for the forms; most of the forms containing Data Bound List Control, displaying the fields of the database, for selecting listed data and pasting into the file in focus.

7. A method according to claim 6, wherein the Variable, Array, Function, Argument, #define, and Typedef forms each consists of:

(1) "PrefixSearch" and "List" Data Bound List Control, Edit Control, Letter Button, and Data Switching Option Button;

(2) When a form is displayed, "List" Data Bound List Control diaplays the values of variables, arrays, function, argument names, definition character strings, or type definition character strings from corresponding fields of var, array, func, argument, define, or typedef tables, according to the True value of choice field of cpphead table; displaying corresponding fields of prefix table in "PrefixSearch" Data Bound List Control; clicking the character of "PrefixSearch" Data Bound List Control, or clicking Letter Button, or hitting the key on the keyboard, enabling a fast search of the data in the List Data Bound List Control; values of fields Prefix can be further edited;

(3) Double clicking the data in "List" Data Bound List Control and then clicking Paste Button first copying the data and then pasting the selected into the file in focus, or clicking Data Switching Option Button displaying the extracted data of various form; right clicking type definition character string or function name displaying Prototype form, and listing native type or function prototype, which can be further edited to become an expression of function definition which can be extracted and pasted in a file in focus;

(4) Double clicking argument name to test the type of the argument according to the data in argtype field of argument table;

A) if there is a keyword struct, union, enum, or class in argument type, using the character string to the right of the keyword as a tag name, according to keyword type and searching through the tag field of related table get tag name native ID; if there is no keyword, first considering the argument type as a tag name, and searching through the tag name field of class, struct, uniont, and enum tables for a matching tag name native ID; if there is a in a tag name, using the character string to the left of "*" as a tag name, and adding a "-->" to it in the Edit Control, otherwise, adding a ".", and if there is any blank space, using the character string to the left of the blank space as a tag name;

B) if the argument type is tested to be a type definition character string, it is converted to be native type from the kind field of typedef table, and following the above-mentioned procedure for extraction;

C) if the argument type match the test, closing the form to display object form, selecting data from corresponding field according to tag name native ID, and displaying the result in "Data" list of object form.

8. A method according to claim 6, wherein the Struct, Union, Enum, and Class object forms each consists of:

(1) "Object" and "Data" Data Bound List Controls, Edit Control, Letter Button, and Data Switching Option Button, "Class Object", "Class Name", "Private", "Protected", and "Public" Option Buttons, and "All-Data" Check Box;

(2) When each form dispays, according to the ID of the file in focus, displaying the local and global object names of the corresponding fields of structobj, unionobj, enumobj, or classobj table in "Object" Data Bound List Control; clicking "ClassName" Option Button listing the class name of class field in "Object" Data Bound List Control;

(3) Doubling clicking the object name in "Object" Data Bound List Control copying the object name into the Edit Control; if checking the pointer field of the object name to be True, adding a "-->" to it; otherwise, adding "."; if it is a enum object name, adding "="; if a class tag name, adding "::"; selecting correspondig data from database according to object name native ID, and displaying it in "Data" Data Bound List Control; if the native ID is a class native ID, setting "Public" Option Button, and selecting corresponding public data members and member functions from classdata and public tables, to display in "Data" Data Bound List Control; clicking "Private" or "Protected" Option Button selecting private or protected data from classdata, private, and protected tables, and displaying in "Data" Data Bound List Control;

(4) Doubling clicking the data member or member function of "Data" Data Bound List Control copying the data into the Edit Control, and following the above-mentioned procedure for identifying argument type to check data members, according to tag name native ID displaying data of corresponding fields in "Data" Data Bound List Control; after the member function is copied into the Edit Control, it is checked to verify having "::" ending, extracting argument name of function prototype and inserting it in between "(" and ")"; if data member has "::" at the end of the character string when copying into the Edit Control, and data member type is class, struct, union, or enum, data member being a tag name of a nested structure; according to tag name native ID displaying data of corresponding fields in "Data" Data Bound List Control, and adding "::" in the Edit Control;

(5) A) pressing control button and clicking class object or tag name will select all the data members and member function of the name, and display then in "Data" Data Bound List Control;

B) clicking "AllData" Check Box will list all data members in "Data" Data Bound List Control according to form type;

C) right clicking one of the value in the "Data" Data Bound List Control will display "Prototype" form, with data members or member functions prototype listed. While being displayed, the member functions prototype are combined with the character string with "::" ending in the Edit Control become a class member function definition expression, and can be extracted and pasted into the file in focus;

(6) pressing "Paste" button will paste the program code in the Edit Control into the file in focus; or clicking Data Switching Option Button to display the extracted data of different forms.

9. A method according to claim 6, wherein the New and Create form each consists of:

a. "struct, "union", "enum", "typedef", and "class" Option Buttons, multiple Data Bound List Controls, an Edit Control; the New form is used for coding of variables, functions, definition strings, and type definition character strings; Create form is used for coding structured expressions;

b. after the form is displayed, selecting from a single or composite member keyword of the key field of input table or the create field of create table in the Data Bound List Controls can copying into the Edit Control; key, and create fields can be further edited;

c. clicking Option Button for selecting tag names of struct, uniont, enum, or class field, or type definition character string of typedef field, and displaying in a Data Bound List Control for further copying into Edit Control;

d. after pasting the data in the Edit Control into the file in focus, following the extraction procedure for variables, functions, definition character strings, type definition, and structure expressions for extraction.

10. A method according to claim 6, wherein the Instance form consists of a. "struct, "union", "enum", "typedef", and "class" Option Buttons, pull-down list, an Edit Control; clicking Option Button for selecting tag names or typedef definition character strings in pull-down list, inputting object names into Edit Control to form an object instance expression;

b. after pasting the data into the file in focus, following the extraction procedure for object instance expression for extraction.

11. A method according to claim 6, wherein the Loop form consists of a. "do while ( );", "do { } while ( );", "while ( )", "if ( )", "for (;;)", "for (;;) { }", "if ( ) else", "if ( ) { } else", "if ( ) { } else { }", "#ifdef #endif", "ifdef #else #endif", and "switch ( ) {case:break;default: }" Condition Option Label Control, "Sequent" and "Nest" Option Buttons, and "Times:" Edit Control;

b. selecting "Sequent" or "Nest" Option Button and inputting an number into the "Times:", and clicking Condition Option Label Control, will have expressions of single-layer or multi-layer of sequented and nested condition loops automatically written into the file in focus; setting the times of "case:break" can automatically duplicate it in the file in focus.

12. A method according to claim 6, wherein the Note1 and Note2 forms each consists of Data Bound List Control, and Letter Button; when Note1 form displays, data of frequently used comments in cmt field of comment1 table is displayed in Data Bound List Control; when Note2 form displays, data of extracted comments in cmt field of comment2 table is displayed in Data Bound List Control; doubling clicking the comments displayed can copy the comment into the file in focus and "/**/" or "//" is added automatically.

13. A method according to claim 6, wherein the File form is an interactive File Dialog Control, which provides file path and name; when the file path and name is pasted into the file in focus, the file path and name is converted to the format of programming language.

14. A method according to claim 6, wherein the Module form consists of:

a. a Data Bound List Control displaying module names stored in modname field of module table, and a Edit Control displaying the content of the modules store in modcontent field, and the content of the modules can be pasted into the file in focus;

b. clicking Module button with reversed text block displays an input dialog; storing inputted module name in modname field of module and reversed text block in modcontent field.

15. A method according to claim 6, wherein the clicking pull-down class Data Bound List Control and function Data Bound List Control display the data stored in findclass field of parclass table and findfunc field of parfunc table separately; the displayed can be fast searched for class member function definition of the file in focus.

16. A method according to claim 6, wherein the DeleteFile form consists of Data Bound List Control which displays file names stored in cpphead field of cpphead table; clicking displayed file name and pressing DeleteFile button enable the deletion of extracted data of the file from database.

* * * * *